United States Patent

Arimura

[15] 3,668,309

[45] June 6, 1972

[54] METHOD AND APPARATUS OF RECORDING AND REPRODUCING ELECTRICAL SIGNALS

[72] Inventor: Ichiro Arimura, Kyoto, Japan

[73] Assignee: Matsushita Electric Industries Co., Ltd., Osaka, Japan

[22] Filed: May 18, 1970

[21] Appl. No.: 38,358

[30] Foreign Application Priority Data

May 21, 1969 Japan....................................44/40793
May 21, 1969 Japan....................................44/40794

[52] U.S. Cl.......................................178/5.4 CD, 178/6.6 TC
[51] Int. Cl.........................H04n 5/14, H04n 5/78, H04n 9/02
[58] Field of Search.......................178/6.6 TC, 6.6 A, 5.4 CD; 340/174.1 B

[56] References Cited

UNITED STATES PATENTS 3,506,777 4/1970 Carlson..............................178/5.4 CD

*Primary Examiner*—Howard W. Britton
*Attorney*—Stevens, Davis, Miller & Mosher

[57] ABSTRACT

A recording and reproducing system having means for correcting a timing variation error (horizontal jitter) introduced into a reproduced signal as in magnetic recording and reproducing systems by frequency-multiplying a reference signal simultaneously reproduced during the reproducing process up to nearer the carrier frequency of the reproduced signal and using the frequency-multiplied reference signal and signals having frequencies higher than the frequencies of those signals to compensate the timing variation component in the reproduced signal.

7 Claims, 11 Drawing Figures

I. ARIMURA
INVENTOR

BY Stevens, Davis, Miller & Mosher
ATTORNEYS

INVENTOR

BY

ATTORNEY

INVENTOR

BY

ATTORNEY

METHOD AND APPARATUS OF RECORDING AND REPRODUCING ELECTRICAL SIGNALS

This invention relates, in recording and reproducing systems whose operation process is subject to timing variations such as in video tape recorders, to a method and an apparatus for obtaining a reproduced signal with reduced timing variations by greatly compensating and reducing timing variations introduced during recording and reproducing a modulated television carrier signal through a special circuit arrangement.

In the conventional art of recording and reproducing a broad-band electrical signal such as a television signal with a simple video tape recorder for household, educational and industrial use, one of the serious problems involved is to eliminate or reduce the timing variation error component introduced into the reproduced signal chiefly due to insufficient precision of the electrical and mechanical construction of the recording and reproducing system, slight vibrations of the recording and reproducing (magnetic) tape introduced in the recording and reproducing process, etc. Therefore, a phase modulated color television signal (such as in NTSC and PAL systems) cannot be reproduced. Even with a monochrome television signal the variations exceeded the follow-up characteristic of the horizontal synchronization AFC circuit of the receiving monitor causing unwanted vibrations (flutter and wow). Thus, through the history of a video tape recorder, it has been one of the major problems to eliminate the timing variations, and it is well known that Ampex Co. and RCA Co. in the United States announced the broadcast-purpose VTR series 1,000 and 2,000, in which timing variations may be substantially eliminated by detecting the timing variation component in the reproduced signal and reversely compensating the timing variations in the reproduced signal by means of a variable delay line utilizing the detected signal. Also, a recording and reproducing system, disclosed in the U.S. Pat. No. 2,979,558 issued to R.C.A. Co., (Japanese Pat. publications Nos. 1,054/61 and 2,180/58), wherein timing variations are eliminated only for the phase modulated chrominance carrier signal in a composite color signal, is well known. In this system, however, the circuitry for eliminating the timing variations, the tape-driving system and other mechanical systems require extremely high precision to meet the demand of eliminating the timing variations, so that this system cannot be applied to the said household, educational and industrial video tape recorders in view of maintenance cost.

Accordingly, the invention is intended to apply and extend the principle of the system disclosed in the U.S. Pat. No. 2,979,558 so as to widely reduce or remove errors introduced due to timing variations during the reproduction of particularly, television signals with an ordinary recording and reproducing apparatus such as video tape recorders through circuit means which is relatively simple in construction and low in manufacturing and maintenance cost.

The principal object of the invention is to reduce timing variations during the reproduction of television signals (including composite color signals) by referring to a simultaneously reproduced continuous or periodical pilot signal which has been superimposed on the recorded signal.

Another object of the invention is to eliminate timing variation component accompanying both the luminance and color signals of the reproduced color signal by presetting the aforementioned pilot signal suitably for eliminating the above timing variation component in the recording and reproduction of modulated color signals, wherein the timing variation component accompanying the reproduced color signal is removed in accordance with a known method (for instance, as disclosed in the U.S. Pat. Nos. 3,095,472 and 2,979,558) and only the timing variation component accompanying the reproduced luminance signal (for a modulated wave) is removed according to the method set forth in the principal object.

A further object of the invention is to provide a method for removing only the timing variation component accompanying the sinchronizing signal component of a reproduced television signal in accordance with the method set forth in the principal object to stabilize the projection of an image in a television receiver and also to attain the object with a simple construction.

These and other objects and features of the invention will become more apparent from the following description of the principles and embodiments of the present invention taken in conjunction with the accompanying drawings, in which:

FIGS. 1*a*, 1*b*, 1*c*, 1*c*, 1*d* and 1*e* are signal spectrum diagrams to illustrate the principles of the present invention;

Prior to describing the specific embodiments of the present invention, the principles of the present invention will be described with reference to the spectrum diagram in FIGS. 1*a* to 1*e*.

Figures 1A, 1B, 1C, 1D, 1E:
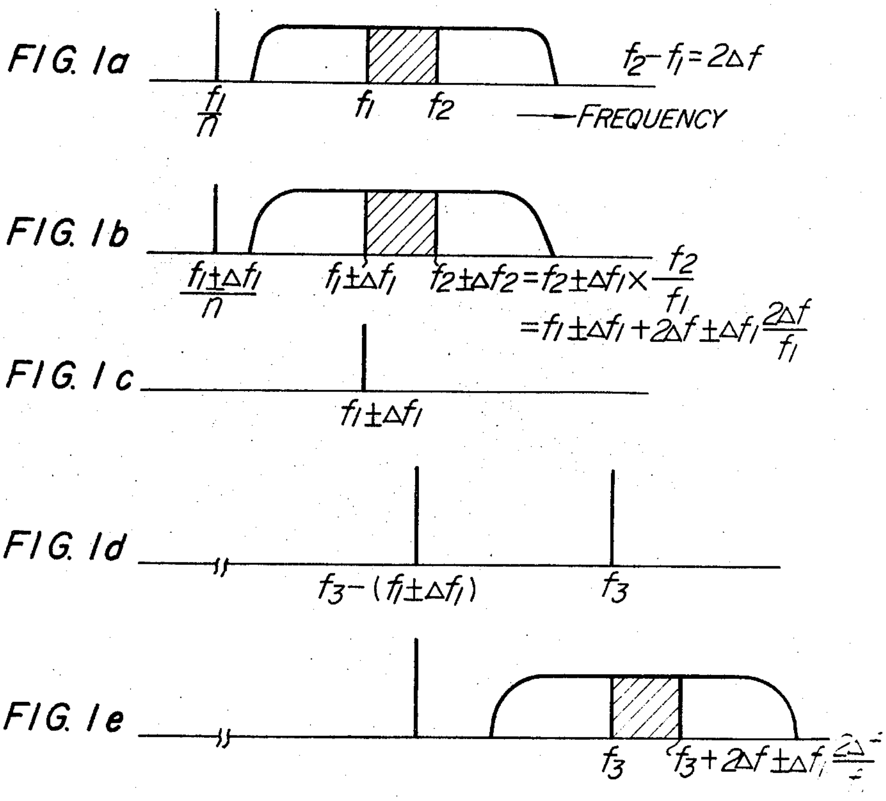

It is now assumed that on a frequency modulated wave with a modulated frequency bandwidth $2\Delta f$ between frequencies $f_1$ and $f_2$ carrying a television signal ranging from the sync signal tip to the white peak is superimposed a pilot signal of a frequency $f_1$ that is, the energy which is shown in FIG. 1*a* is recorded and reproduced by a recording and reproducing apparatus such as a video tape recorder. During the reproducing process the reproduced frequency modulated wave and the pilot signal are subject to phase or frequency variations because of the accompanying timing variation component. Denoting the change in frequency with respect to the frequency $f_1$ by $\pm\Delta f_1$, the frequencies $f_1/n$, $f_1$ and $f_2$ are respectively changed to $(f_1 \pm\Delta f_1)/n, f_1 \pm\Delta f_1$ and $f_2 \pm\Delta f_2 = f_1 \pm\Delta f_1 + 2\Delta f \pm\Delta f_1 \cdot (2\Delta f/f_1)$, as shown in FIG. 1*b*.

Then, the frequency $(f_1 \pm\Delta f_1)/n$ of the reproduced pilot signal is multiplied by $n$ to obtain a signal of a frequency $f_1 \pm\Delta f_1$, as shown in FIG. 1*c*, which signal is then heterodyned in the presence of a stable signal of a frequency $f_3$ to obtain a difference frequency $f_3-(f_1 \pm\Delta f_1)$, where $f_3 >> f_1, f_2$, as shown in FIG. 1*d*. The frequency $f_3$ is selected to be sufficiently higher than the frequencies $f_1$ and $f_2$, because the condition $f_3 \cong f_1$ is unfavorable in connection with the modulation frequency band.

The reproduced frequency modulated wave is then heterodyned with the frequency $f_3 - (f_1 \pm\Delta f_1)$ to derive the resultant sum on the upper side of that frequency, as shown in FIG. 1*e*. Thus, the resultant frequency modulated wave has a modulated frequency bandwidth between $f_3$ and $f_3 + 2\Delta f$, which is free from a timing variation at $f_3$ (sync signal tip) and involves a variation component at a modulated frequency $f_3 + 2\Delta f$ (white peak) which is equal to a variation component $\Delta f_1$ at the frequency $f_1$ multiplied by $2\Delta f/f_1$.

In a usual magnetic recording and reproducing apparatus such as video tape recorders, frequency modulation with a low modulation index is adopted, and in fact $2\Delta f/f_1$ is selected to be about one-third to one-seventh, so that, when a frequency modulated wave in a high frequency range as shown in FIG. 1*e* is directly demodulated, the timing variation component of the demodulated television signal is reduced to zero at the sync signal tip and to one-third to one-seventh at the white peak.

The selection of the pilot signal frequency, particularly in the above description, aims at stabilizing the synchronization signal system, and of course the pilot signal frequency may be selected near $f_1/n$ to $f_2/n$. Also the pilot signal frequency may be chosen to be convenient for the recording and reproduction of the composite color signal as will be described hereinafter.

Next, a method for producing a reference signal in place of a reference pilot signal will be described.

Figure 2:
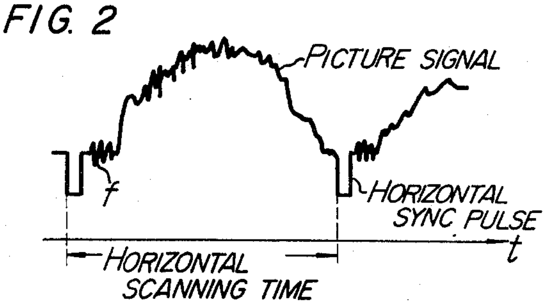
FIG. 2 shows a waveform of a composite color television signal (in NTSC system) in the horizontal scanning period.

In a first method, in case that a NTSC standard composite color signal which is employed in Japan and United States, whose waveform is exemplified in FIG. 2, is to be recorded and reproduced, a color burst signal as indicated by symbol f may be utilized, and in the case of the monochrome signal an appropriate signal equivalent to the burst signal is beforehand superposed onto the monochrome signal. Those intermittent signals may be utilized as a reference signal indicating the timing variation component of the continuous wave while it is reproduced. In setting the frequency of the equivalent signal of the burst signal for the monochrome signal, it will be convenient in NTSC system, to select a frequency of 3.6 MHz and introduce a signal of about 8 cycle similar to the color burst signal by taking into consideration the compatibility with the composite color signal processing. The selection of the frequency, of course, may be made otherwise. At any rate, the color burst signal or an equivalent intermittent signal is changed into a continuous signal and multiplied by a factor $q/p$ to have a frequency near the afore-mentioned frequencies $f_1$ to $f_2$ so as to be of use as a reference signal.

Figure 3:
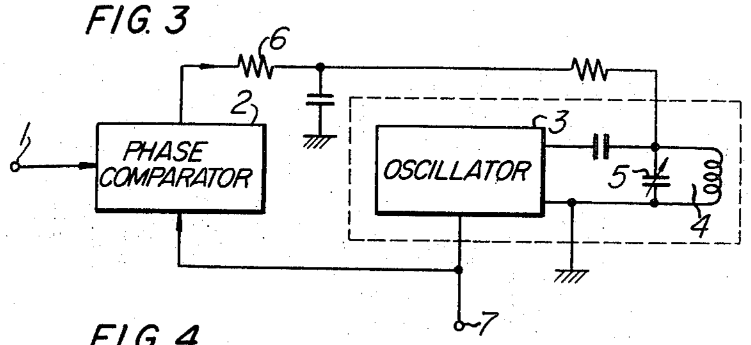
FIG. 3 shows the principal construction of the automatic phase control circuit (APC) which forms part of one embodiment of the present invention.

The equivalent signal of the burst signal may be readily produced by a known circuit consisting of a fixed signal source and a gate mixer, etc., so the detailed description will be omitted. A brief description will be made of a circuit for converting the burst signal or an equivalent intermittent signal into a continuous wave. As means for intermittent the burst (or an equivalent) intermittent signal into a continuous wave, there is an automatic phase control circuit (hereinafter abbreviated as APC) which is adopted in color television receivers. An example of the APC circuit having an extended input frequency range is shown in FIG. 3. It comprises an oscillator 3 which is a known oscillator such as a Colpitts or a Hartley oscillator, a tank circuit 4 having a variable capacitor 5 whose capacitance is variable depending on an interelectrode voltage. In its operation, a burst (or equivalent) signal fed to an input terminal 1 is subjected to intermittent phase detection by a phase comparator 2, which also receives an output signal from the oscillator 3, to deliver a phase error output voltage through a circuit 6 having a suitable time constant to the tank circuit 4 thereby varying the capacitance of the tank circuit 4 to synchronize the phase of the output signal from the oscillator 3 with that of the input burst (or equivalent) signal. Since the timing variation component of the reproduced burst (or equivalent) signal is imparted to the oscillator output, the output signal of the oscillator may be used as a reference signal in the same way as the pilot signal.

Figure 4:
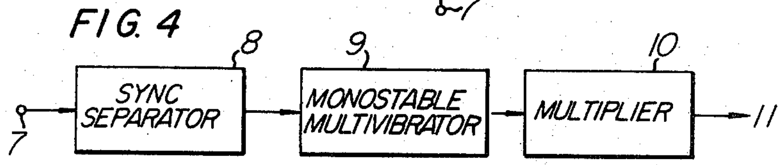
FIG. 4 is a block diagram showing the construction of a frequency-multiplier, which forms part of one embodiment of the present invention.

In another method for producing a reference signal to be substituted for the pilot signal, a synchronizing signal is taken as a reference because the timing variations introduced during the reproduction of the television signal have the same effect on the synchronizing signal component as on the afore-mentioned burst (or equivalent) signal. An example of the circuit to carry out the second method is shown in FIG. 4. From the reproduced television signal impressed on an input terminal 7 is separated a synchronizing component by a sync separator 8 which component triggers a 50—50 duty monostable multivibrator 9 to produce a square-wave of a distorted-wave output, which is in turn multiplied by a multiplier 10 to derive a high frequency component available at an output terminal 11 as a reference signal comprising a desired timing variation component.

Figure 5:
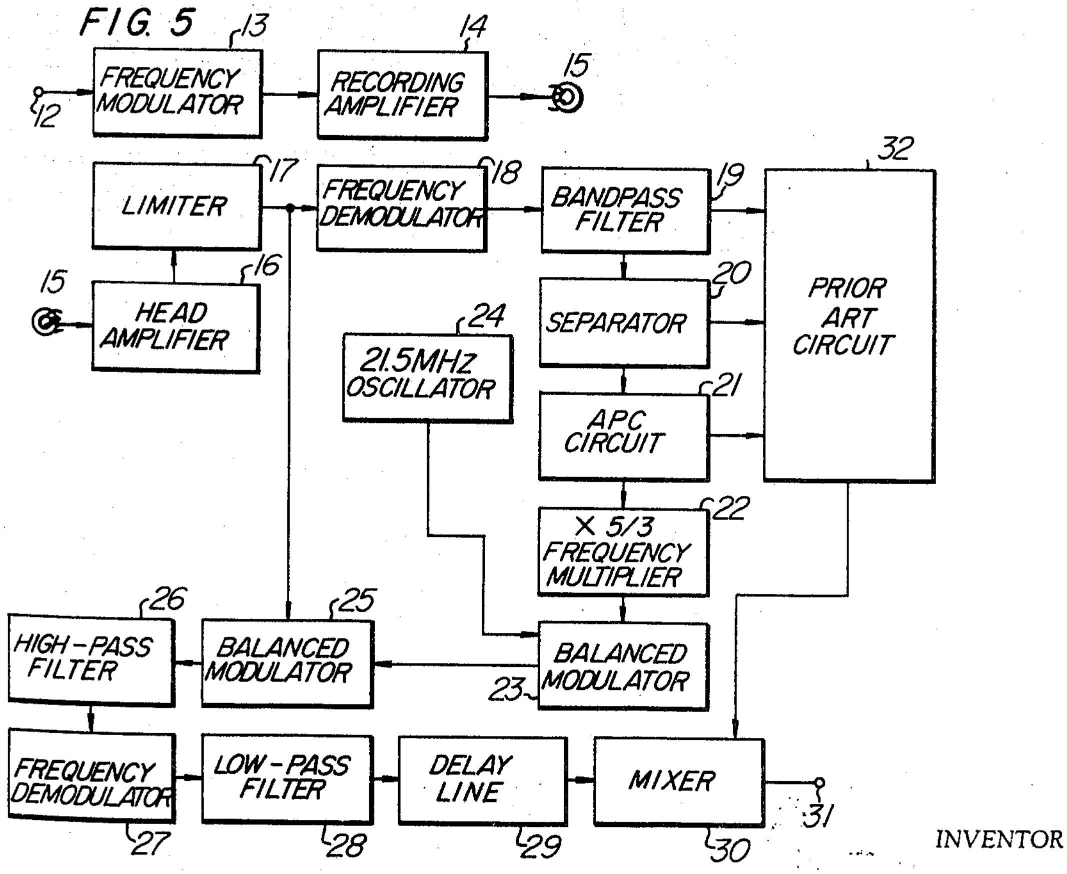
FIG. 5 is a block diagram showing a first embodiment of the television signal recording and reproducing system according to the present invention.

An embodiment of the recording and reproducing apparatus according to the present invention will now be described with reference to FIG. 5.

The case of recording and reproducing a composite color television signal in accordance with NTSC system will be taken as an example. A composite color television signal covering a bandwidth of about 4 MHz is fed to an input terminal 12, which is frequency-modulated by a frequency modulator 13 into a modulated signal having a modulated bandwidth of, for instance, 6 to 7 MHz, which is then amplified by a recording amplifier 14, whose output drives a recording head 15 of a wideband signal recording and reproducing apparatus such as a video tape recorder to write a signal on a (magnetic) recording tape. During reproduction, the modulated signal reproduced from the reproducing head 15*a* similar to the recording head is amplified through a head amplifier 16, is passed through a limiter 17 and demodulated by a frequency demodulator 18 to obtain a reproduced composite color signal, which is fed through a bandpass filter 19 to obtain a chrominance carrier signal component, to a separator 20 for separating a color burst output signal, which is applied to the afore-described APC 21 thereby making it phase-locked. The output signal having a frequency 3.6 MHz from the APC circuit 21 is fed to a frequency multiplier 22 to multiply the signal frequency by a factor about five-thirds, thus establishing a frequency of 6 MHz. The output of the frequency multiplier 22 is applied to a balanced modulator 23 together with the output of a 21.5 MHz oscillator 24 to prepare a lower side 15.5 MHz output, which is balance-modulated with the reproduced frequency modulated wave by means of a balanced modulator 25 to obtain a frequency-modulated wave converted in the upper side high frequency region. At this time, the timing variation component is reduced. As the reproduced frequency modulated wave has a modulated bandwidth 6 to 7 MHz and covers a spectrum band ranging substantially from 2 to 11 MHz, the spectrum energy of the frequency modulated wave converted in the high frequency region extends over a frequency band ranging from 15.5 to 26.5 MHz. The output form the balanced modulator 25 passes through a high-pass filter 26 which blocks the 15.5 MHz output component and is demodulated by a frequency demodulator 27 to derive a reproduced composite color television signal. The signal thus derived may be directly employed as an input to a monitoring color television receiver if the timing variation component in the output from the recording and reproducing apparatus is small. If the timing variation component is large, the output signal of the frequency demodulator 27 is passed through a low-pass filter 28 to produce a luminance signal, which is recomposed through a mixer 30 with a chrominance carrier signal which has been made free from the timing variation component through a circuit 32 employing a known technique (as disclosed in the U.S. Pat. No. 2,979,558 and Japanese Pat. Nos. 1,054/61 and 2,180/58), so as to provide an output at an output terminal 31 whose timing variation components are reduced in both the luminance and chromaticity components thereof. A delay line 29 is provided to correct the difference in a transfer time between the luminance and chromaticity component processing circuits.

In the foregoing embodiment, the principles of the present invention is directly adopted in carrying out the signal processing. In this embodiment the reference signal is derived from the burst signal.

Figures 6, 7:
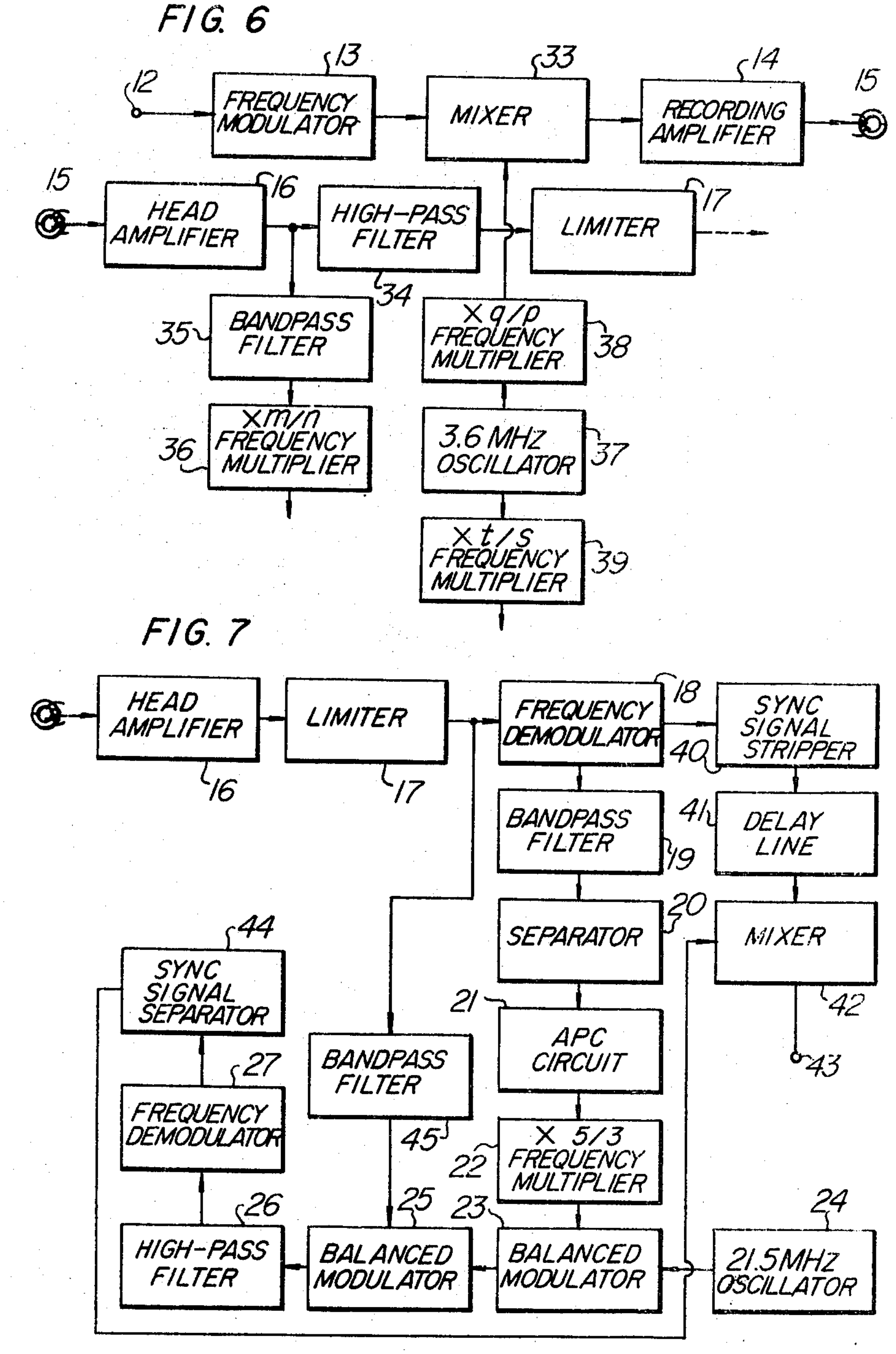
FIG. 6 is a block diagram showing a second embodiment of the television signal recording and reproducing system according to the present invention.
FIG. 7 is a block diagram showing a third embodiment of the television signal recording and reproducing system according to the present invention.

In a second embodiment shown in FIG. 6, a pilot signal is chosen as the reference signal. This embodiment is different from the previous embodiment utilizing the burst signal in that a stable fixed 3.6 MHz oscillator 37 is provided for the recording process, and the output signal of the oscillator 37 is fed to a frequency multiplier 38 to multiply the output frequency by a factor of $q/p$, for instance one-tenth to obtain 360 KHz, before it is applied to a mixer 33 to be mixed with the frequency-modulated wave to be prepared for recording. During the reproduction, the output of the head amplifier 16 is passed through a bandpass filter 35 to separate the pilot signal, whose frequency is then multiplied by a frequency multiplier 36 by a factor of $m/n$ to obtain a frequency, for instance, 6 MHz. The frequency-multiplied output of the frequency multiplier 36 is equivalent to that of the frequency multiplier 22 in the previous embodiment. On the other hand, the output of the oscillator 37 is applied to a frequency multiplier 39 to establish a frequency, for instance, 21.5 MHz by multiplying by a factor *t/s*. The output of the frequency-multiplier 39 is equivalent to that of the oscillator 24 in the previous embodiment. A high-pass filter 34 serves to prevent the pilot signal from interfering with the frequency modulated wave. Other operations and the results are the same as in the previous embodiment. The frequency of the oscillator 37 is selected to be 3.6 MHz taking into consideration the compatibility with the NTSC color signal processing.

When processing the monochrome television signal, it will be apparent that the circuit blocks 32, 28, 29 and 30 should be omitted from the foregoing two embodiments and the output of the frequency demodulator 27 constitutes a reproduced monochrome television signal having reduced timing variation components.

A third embodiment of the recording and reproducing apparatus will now be described with reference to FIG. 7.

As the signals disposed by the ordinary recording and reproducing apparatus such as video tape recorders are generally wide-band signals, there is some cases wherein the adjustment in the previous two embodiments is rather difficult. In such cases, the adjustment may be simplified to obtain the similar results by making use of the sync signal in the reproduced television signal to remove the timing variation component. Also, particularly in video tape recorders, the energy of the timing variation component is predominant at frequencies below a field scanning frequency, so that, even when the timing variation component is removed from only the sync signal, the picture on the television receiver reproduced from the television signal is stable because the slope of variation is gradual. Rather, the synchronization in the television receiver is very stable as the synchronizing system of the reproduced signal is stable. Thus, the instability of the picture is far reduced as compared with the picture reproduced from the ordinary television signal comprising timing variation components therein.

In the case of recording and reproducing the composite color signal as described with reference to the first embodiment, the reproducing process is similar to that of the first embodiment except that the output of the frequency demodulator 18 is stripped of the sync signal by means of a sync signal stripper 40 such as a slicer. On the other hand, as the reproduced frequency-modulated wave takes the modulation spectrum of the sync signal as its reference, the reproduced frequency-modulated wave is passed through a bandpass filter 45 at its modulation bandwidth at most 6 to 7 MHz to thereby remove the timing variation component through the balanced modulator 25 in the same manner as the first embodiment. By demodulating the frequency-modulated wave converted in the high frequency region through the afore-mentioned high-pass filter 26 and a frequency demodulator 27, a television signal free from the high frequency component may be obtained, whose sync signal component alone is separated by a sync signal separator 44 to recombine with a directly demodulated television signal which contains no sync signal by a mixer 42, thus producing a television signal at an output terminal 43 whose sync signal contains no timing variation component. A delay line 41 compensate the timing difference between the two input signals to the mixer 42.

With the above arrangement, a narrow-band signal processing is attained, and it is possible to obtain other advantages such as simplified adjustment and reduced cost. Also, the effects similar to the preceding first and second embodiments may be obtained.

Although the present invention has been described with reference to some embodiments in connection with the objects thereof, it will be apparent that within the gist of the present invention are contained various changes and modifications other than the foregoing embodiments.

It is sure that the removal of the timing variation component is the signals reproduced from the VTR and other recording and reproducing apparatuses is now one of the important requirements for obtaining stable reproduced pictures, particularly reproduced from television signals, and that the present invention provides one of the useful technical measures to comply with this requirement.

What is claimed is:

1. Apparatus for compensating for time variation components in a television signal reproduced from a magnetic recording and reproducing system, comprising:
means for recording a frequency modulated television signal on a magnetic recording medium, said television signal containing a reference signal, a luminence signal and a chrominance signal, said chrominance signal containing said time variation components;
first means for reproducing said recorded television signal;
second means for separating said chrominance signal containing said time variation components out of said television signal;
third means for removing said time variation components from said chrominance signal;
fourth means for separating said reference signal out of said reproduced television signal;
fifth means for generating a continuous signal having a frequency which is within the frequency band of said frequency modulated television signal and having a phase which is synchronized with the phase of said reference signal;
sixth means for obtaining a difference signal corresponding to the difference between said continuous signal and a signal corresponding to said reference signal;
seventh means for adding said difference signal and said reproduced television signal;
eighth means for detecting the output of said seventh means;
ninth means for separating said luminence signal component from the output signal of said eighth means; and
tenth means for combining the outputs of said third means and said ninth means to produce a composite television signal substantially free from said time variation components.

2. The apparatus according to claim 1, wherein:
said first means comprises magnetic head means, a first frequency demodulator, and means connecting said magnetic head means to said first frequency demodulator;
said second means comprises a band pass filter connected to the output of said first frequency demodulator;
said fourth means comprises a separator circuit connected to the output of said band pass filter for separating said reference signal out of said separated chrominance signal;
said sixth means comprises an automatic phase control circuit connected to the output of said separator circuit, a first balanced modulator, and means connecting the outputs of said automatic phase control circuit and said fifth means to said first balance modulator;
said seventh means comprises a second balanced modulator, means applying said reproduced television signal to said second balanced modulator, and means applying the output of said first balanced modulator to said second balanced modulator;
said eighth means comprises a high pass filter and a second frequency demodulator connected to the output of said high pass filter;
said ninth means comprises a low pass filter connected to the output of said second frequency demodulator; and
said tenth means comprises a mixer means applying the output of said third means to one input of said mixer, and means applying the output of said low pass filter to a second input of said mixer.

3. The apparatus according to claim 2, wherein said fifth means comprises a fixed frequency oscillator and said sixth means further comprises a frequency multiplier connected between the output of said automatic phase control circuit and the input of said first balanced modulator.

4. The apparatus according to claim 2, wherein:

said means for recording comprises means for frequency modulating a composite color television signal, a further mixer connected to the output of said frequency modulating means, and means connecting the output of said further mixer to further magnetic head means;

in the said first means, said means connecting said magnetic head means to said first frequency demodulator includes a further high pass filter;

said fifth means comprises a fixed frequency oscillator and a first frequency multiplier connecting said oscillator to said further mixer;

in said sixth means, said means connecting the outputs of said automatic phase control circuit and said fixed frequency oscillator includes a second frequency multiplier;

in said seventh means, said means applying said reproduced television signal to said second balanced modulator includes a further band pass filter connected to said magnetic head means and a third frequency multiplier connected between said further band pass filter and said second balanced modulator.

5. Apparatus for compensating for time variation components in a television signal reproduced from a magnetic recording and reproducing system, comprising:

first means for reproducing a recorded frequency modulated television signal containing at least one synchronizing signal, a reference signal, a luminence signal and a chrominance signal, said chrominance signal containing said time variation components;

second means for separating said chrominance signal containing said time variation components out of said television signal;

third means for removing said synchronizing signal from said reproduced television signal and retaining the remainder of said television signal;

fourth means for separating said reference signal out of said reproduced television signal;

fifth means for generating a continuous signal having a frequency which is within the frequency band of said frequency modulated television signal and having a phase which is synchronized with the phase of said reference signal;

sixth means for obtaining a difference signal corresponding to the difference between said continuous signal and a signal corresponding to said reference signal;

seventh means for adding said difference signal and said reproduced television signal;

eighth means for detecting the output of said seventh means;

ninth means for separating said synchronizing signal component from the output signal of said eighth means; and tenth means for combining the outputs of said third means and said ninth means to produce a composite television signal substantially free from said time variation components.

6. The apparatus according to claim 5, wherein:

said first means comprises magnetic head means, a first frequency demodulator, and means connecting said magnetic head means to said first frequency demodulator;

said second means comprises a band pass filter connected to the output of said first frequency demodulator;

said third means comprises a sync signal stripper, such that the output signal from said stripper contains substantially all of the components of the output signal of said first frequency demodulator except for said synchronizing signal component;

said fourth means comprises a separator circuit connected to the output of said band pass filter for separating said reference signal out of said separated chrominance signal;

said sixth means comprises an automatic phase control circuit connected to the output of said separator circuit, a first balanced modulator, and means connecting the outputs of said automatic phase control circuit and said fifth means to said first balanced modulator;

said seventh means comprises a second balanced modulator, means applying said reproduced television signal to said second balanced modulator, including a band pass filter connected between said magnetic head means and said second balanced modulator, and means applying the output of said first balanced modulator to said second balanced modulator;

said eighth means comprises a high pass filter and a second frequency demodulator connected to the output of said high pass filter;

said ninth means comprises a sync signal separator connected to the output of said second frequency demodulator; and said tenth means comprises a mixer, means applying the output of said third means to one input of said mixer, and means applying the output of said sync signal separator to a second input of said mixer.

7. The apparatus according to claim 6, wherein said fifth means comprises a fixed frequency oscillator and said sixth means further comprises a frequency multiplier connected between the output of said automatic phase control circuit and the input of said first balanced modulator.

* * * * *

PO-1050
(5/69)

UNITED STATES PATENT OFFICE
CERTIFICATE OF CORRECTION

Patent No. 3,668309 Dated June 6, 1972

Inventor(s) ARIMURA, Ichiro

It is certified that error appears in the above-identified patent and that said Letters Patent are hereby corrected as shown below:

The correct name of the Assignee should read as follows:

-- Matsushita Electric Industrial Co., Ltd. --

Signed and sealed this 3rd day of April 1973.

(SEAL)
Attest:

EDWARD M.FLETCHER,JR.
Attesting Officer

ROBERT GOTTSCHALK
Commissioner of Patents